G. O. SMITH.
CAMERA CASING.
APPLICATION FILED OCT. 1, 1915.
1,192,696.
Patented July 25, 1916.
3 SHEETS—SHEET 2.
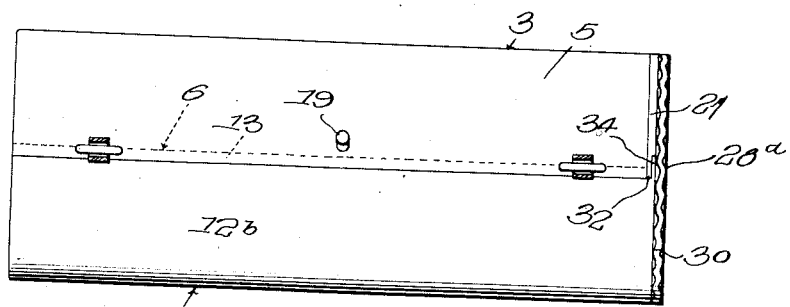
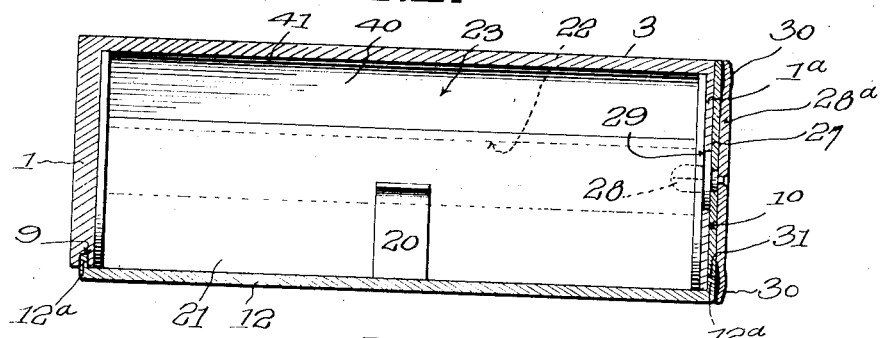
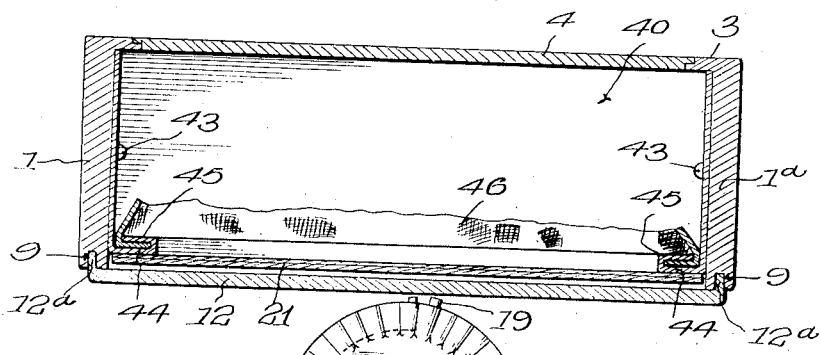
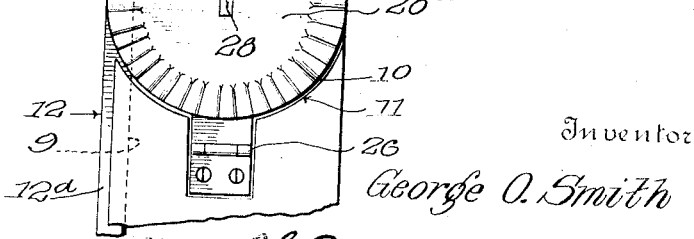
Inventor
George O. Smith
Witnesses
H. Woodard
Attorneys

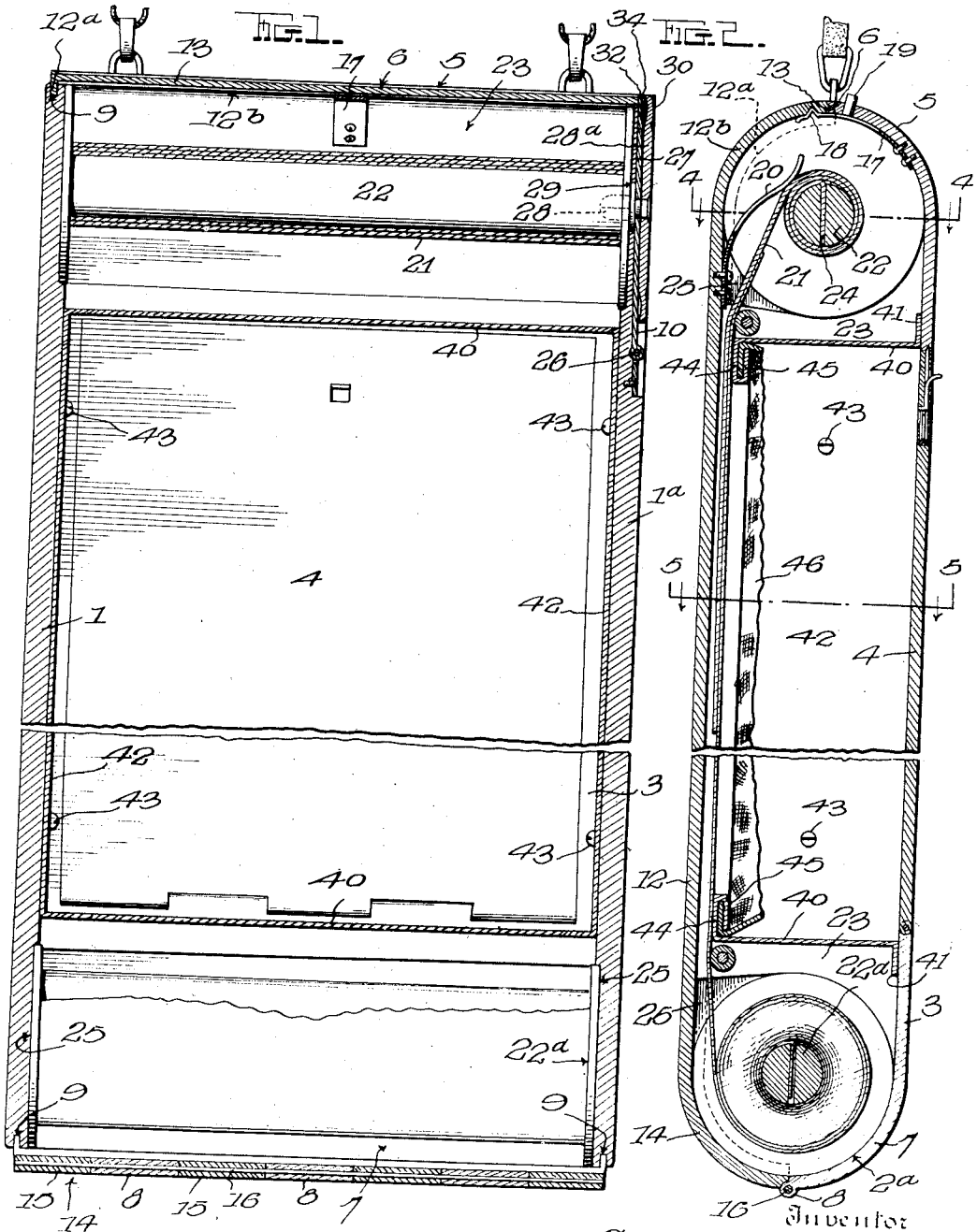

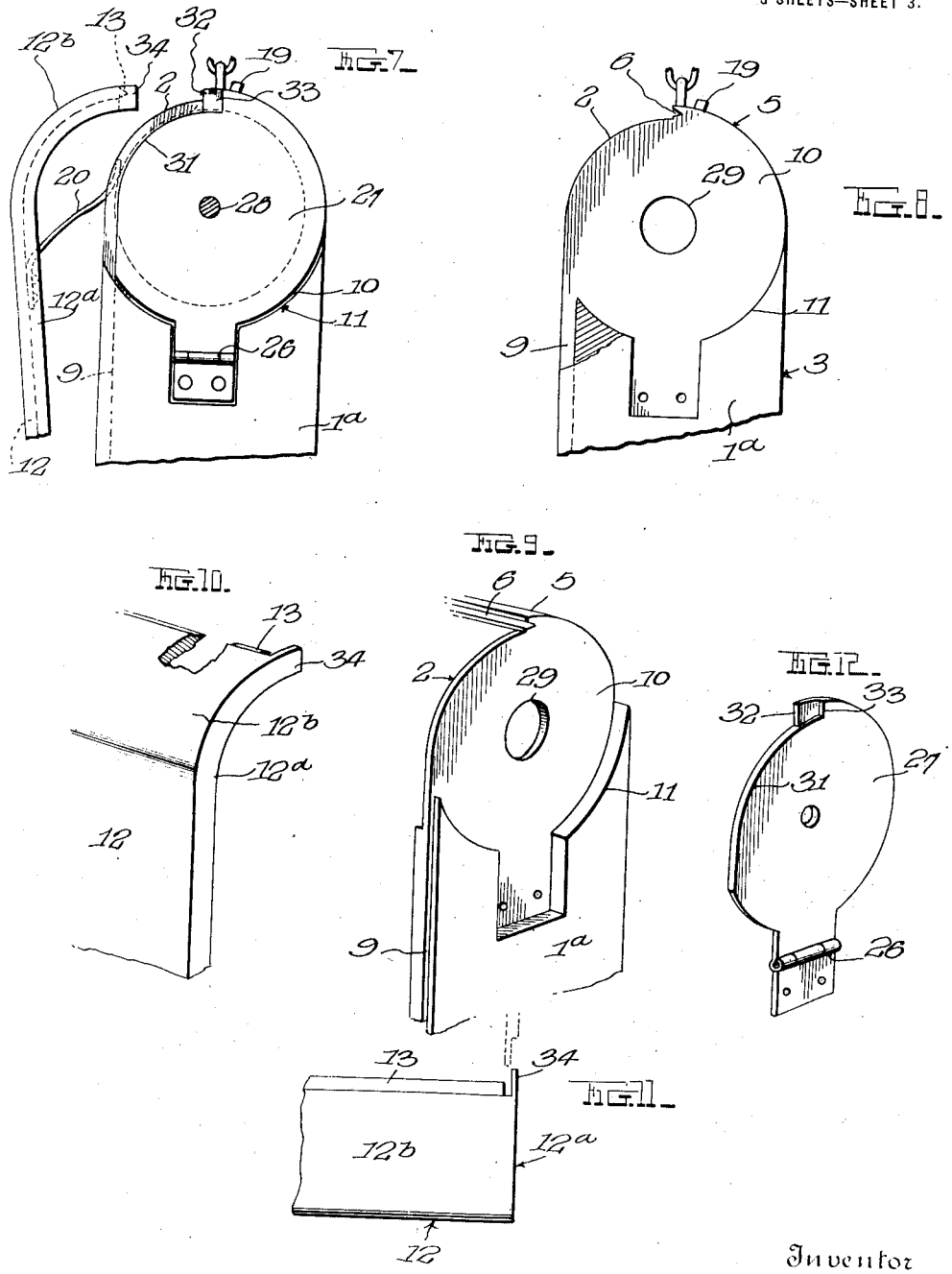

UNITED STATES PATENT OFFICE.

GEORGE O. SMITH, OF ANAHEIM, CALIFORNIA.

CAMERA-CASING.

1,192,696. Specification of Letters Patent. Patented July 25, 1916.

Application filed October 1, 1915. Serial No. 53,552.

*To all whom it may concern:*

Be it known that I, GEORGE O. SMITH, a citizen of the United States, residing at Anaheim, in the county of Orange and State of California, have invented certain new and useful Improvements in Camera-Casings; and I do declare the following to be a full, clear, and exact description of the invention, such as will enable others skilled in the art to which it appertains to make and use the same.

My invention is an improved camera casing embodying a number of improved features.

The object of the invention is to improve upon the construction of casings of the class described to increase the advantages thereof in a number of ways to be hereinafter fully described and claimed, the descriptive matter being supplemented by the accompanying drawings wherein like reference characters designate corresponding parts throughout the several views and wherein, Figure 1 is a longitudinal section of a camera casing constructed in accordance with my invention; Fig. 2 is a similar view taken at right angles to Fig. 1; Fig. 3 is a top plan view; Figs. 4 and 5 are horizontal sections as viewed on the planes of the lines 4—4 and 5—5 of Fig. 2; Fig. 6 is a detail side elevation of one end of the casing with the back thereof in closed position; Fig. 7 is a similar view with the back partially opened, and with parts removed and in section; Fig. 8 is an additional detail side elevation showing more particularly the recess in one end of one side wall of the casing; Fig. 9 is a perspective view of one corner of the casing; Fig. 10 is a similar view of one corner of the back thereof; Fig. 11 is an end view of said back; and Fig. 12 is a perspective view of the laterally swinging plate which carries the film winding device.

In the drawings, the numerals 1 and 1ᵃ indicate the two parallel elongated side walls of the casing, each wall being rounded at one end as shown at 2 and at its other end as indicated at 2ᵃ in Fig. 2. Secured in any preferred manner to the front edges of the side walls 1 and 1ᵃ, being preferably formed integrally with said walls, is a casing front 3 having a hinged door 4 adapted to carry the usual lens and shutter (not shown). One end portion 5 of the front 3 is extended approximately half way around the rounded end 2 of the walls 1 and 1ᵃ and terminates at an angle to said end as seen most clearly in Figs. 8 and 9, the end proper of the portion 5 being preferably formed with a longitudinal V-shaped groove 6. The opposite end portion 7 of the front 3 is curved half way around the rounded end 2ᵃ of the side walls 1 and 1ᵃ and has formed on its terminal a plurality of hinge knuckles 8.

The rear edges of the walls 1 and 1ᵃ are provided throughout their lengths with grooves 9, the groove of the wall 1ᵃ, however, being intercepted by a recess 10 formed in the outer side of said wall and continuing inwardly from the rounded end 2 thereof to the curved line 11 disposed approximately concentric with said rounded end. The grooves 9 receive therein laterally extending flanges 12ᵃ formed throughout the length of the parallel edges of the camera back 12, whereby to effectively exclude light from the interior of the casing. One end portion 12ᵇ of the back 12 is curved around the rounded end 2 of the side walls 1 and 1ᵃ and terminates in contact with the end of the portion 5 of the front 4, being provided with a V-shaped rib 13 received in the groove 6. The other end 14 of the back 11 is grooved around the end 2ᵃ of the walls 1 and 1ᵃ and is equipped with hinge knuckles 15 received between the knuckles 8, a pintle 16 being passed through all of the knuckles whereby to hingedly connect the back 12 with the remainder of the casing.

The back is normally held closed by a spring catch 17 secured to the portion 5 of the front 3 and having a V-shaped projection 18 received in an apertured catch in the portion 12ᵇ of said back, the catch being releasable by the provision of a button or the like 19 disposed on the exterior of the casing. After said catch has been disposed to inactive position, the back 12 will be immediately forced rearwardly by a flat spring 20 secured to the inner side thereof and adapted to bear against the film backing 21 wound on the reel 22 in one of the reel magazines 23 which are disposed in the opposite end of the casing. The spring 20 not only exerts its tension to force the back 11 outwardly when the catch is released, but it prevents removal of the end of the film backing from the slot 24 in the reel 22 when initially winding, and serves as brake means for preventing slack in the film.

The end flanges of the reel 22 as well as those of the other reel 22ª contact with the inner sides of the curved ends of the camera front and back and are received rotatably in recesses 25 formed in the inner sides of the walls 1 and 1ª. This construction is ample for rotatably mounting the two reels and thus the use of stub shafts and the like is unnecessary.

Positioned in the recess 10 and connected to the side wall 1ª by a hinge 26, preferably inset therein, is a substantially circular outwardly swinging plate 27 which carries a winding device 28 extending loosely through an opening 29 in the wall 1ª and into the usual notch at one end of the reel 22. The outer end of the device 28 is secured rigidly in any preferred manner to a winding disk 28ª whose edge is preferably crimped or corrugated at 30, whereby said disk may be rotated by hand. The rear portion of the edge of the plate 27 is preferably spaced inwardly from the remainder of its edge as shown at 31, whereby to form a rearwardly facing shoulder 32 disposed over one end of the groove 6 to exclude light therefrom, the outer side of the plate 27 being formed with a recess 33 opening through the shoulder 32 and receiving normally therein a stop tongue 34 which projects forwardly from the end of the adjacent flange 12ª, such end being disposed in contact with the shoulder 32 as shown in Fig. 3, while the edge of said flange abuts the rear portion 31 of the edge of the plate as shown clearly in Fig. 4. By this construction, the plate 27 and parts carried thereby are prevented from swinging outwardly until the catch 17 is released by pressing the button 19. When this takes place, however, the back 12 is automatically thrown outwardly, thus releasing the plate 27 and allowing it to swing outwardly to retract the device 28 from the reel 22.

Obstructing communication between the central portion of the casing and the reel magazines 23 is a pair of transverse sheet metal partitions 40 whose front edges are bent laterally and secured to the front 3 at opposite ends of the door 4, as disclosed at 41, while connecting the opposite ends of said partitions 40 is a pair of sheet metal plates 42 preferably secured by screws or the like 43 to the side walls 1 and 1ª. The rear edge portions of the partitions 40 and plates 42 are bent laterally inward to form gripping flanges 44, while the free edge portions of such flanges are bent forwardly upon themselves to provide additional gripping flanges 45 coacting with the bodies of said flanges 44 to clamp therebetween the rear end of the usual bellows 46.

All parts of the casing are preferably constructed of aluminum or some such light metal, but obviously they may be formed of wood, fiber, or any other appropriate material if desired.

From the foregoing description, taken in connection with the accompanying drawings, it will be obvious that although the construction of the invention is comparatively simple and inexpensive, it will be highly efficient and durable.

Certain specific details have been shown for illustrative purposes and have been specifically described, but obviously, changes may be made within the scope of the invention without sacrificing any of the advantages thereof.

I claim:—

1. A camera casing having a rearwardly swinging rigid one-piece back, and a reel magazine whose rear side is formed by said back, an outwardly swinging member located on the exterior of and pivoted to one end of the reel magazine, said member carrying a reel winding device projecting into said magazine, fastening means on the back for normally preventing outward swinging of the aforesaid member, a releasable catch for holding the back against outward movement, and spring means for forcing the back outwardly when said catch is released.

2. A camera casing having a rearwardly swinging back, and a reel magazine whose rear side is formed by said back, an outwardly swinging member at one end of the reel magazine carrying a reel winding device projecting into said magazine, fastening means on the back for normally preventing outward swinging of the aforesaid member, a releasable catch for holding the back against outward movement, and a spring secured to the back and projecting therefrom into the reel magazine for contact with a film member wound on a reel in said magazine, whereby said spring serves to prevent slippage of the film member on the reel when initially winding, and as a brake for preventing slack in said film member, and acts to swing the back outwardly when the aforesaid catch is released.

3. A camera casing of flat elongated formation with rounded ends, and having an outwardly swinging one-piece back whose ends are curved forwardly and form half of the aforesaid curved ends of the casing, a reel magazine in each rounded end of the casing, an outwardly swinging member adjacent one end of one of the reel magazines and carrying a reel winding device projecting into said magazine, a stop on the adjacent curved end of the back overlying a portion of said outwardly swinging member to prevent outward swinging thereof until the back is swung out, a catch for normally connecting the last named end of the back with the casing proper, and a hinge connecting the other end of said back with said casing proper.

4. A camera casing of flat elongated formation, a pair of transverse sheet metal partitions in said casing spaced from the ends thereof whereby to provide a pair of reel magazines in said ends, and a pair of elongated sheet metal plates formed integrally with the ends of the partition and secured in contact with the sides of the casing, the rear edges of said partitions and plates being bent laterally inward to form gripping flanges, and the inner edges of said flanges being bent upon the bodies thereof to form additional gripping flanges in combination with a bellows having its rear end gripped between the two sets of flanges.

5. The combination with a camera casing having a pair of parallel elongated side walls, and a rearwardly swinging back, of a plate hinged to one side wall adjacent one end thereof and having a rearwardly facing shoulder, said plate being formed with a recess in its outer side opening through said shoulder, a laterally extending flange on the back having its end disposed in contact with the shoulder and provided with an integral tongue projecting into the recess, and a film winding device carried by said plate and projecting into the casing.

6. A camera casing comprising a pair of parallel elongated side walls each having a rounded end at one end of the casing, a casing front secured to the front edges of said walls and having one of its ends curved part way around the rounded ends thereof, a substantially circular plate hinged to the outer side of one end portion of one side wall and having the rear portion of its edges spaced inwardly from the remainder of such edge to form a rearwardly facing shoulder adjacent the end of the casing front, the outer side of said plate being formed with a recess opening through said shoulder, a casing back having one end portion curved around the rounded ends of the side walls and terminating in contact with the curved end of the front, a laterally extending flange on said curved end portion of the back contacting respectively at its edge and at its end with the rear portion of the edge of the plate, and with the shoulder of said plate, a tongue extending from said end of the flange into the recess in said plate, and a reel winding device carried by said plate and extending into the casing.

In testimony whereof I have hereunto set my hand in presence of two subscribing witnesses.

GEORGE O. SMITH.

Witnesses:
E. B. SPRAGUE,
ARCHIE D. ARBOGAST.